US005322558A

United States Patent [19]

Wittekind et al.

[11] Patent Number: 5,322,558

[45] Date of Patent: Jun. 21, 1994

[54] NEUTRALIZING AGENT FOR PAPER PRODUCTS

[75] Inventors: Jurgen Wittekind, Frankfurt am Main; Rolf Eggersdorfer, Bad Homburg/Taunus; Peter Schwerdt; Karl-Heinz Scherer, both of Frankfurt am Main; Rolf-Erhard Schmitt, Harxheim, all of Fed. Rep. of Germany

[73] Assignee: Battelle Ingenieurtechnik GmbH, Eschborn, Fed. Rep. of Germany

[21] Appl. No.: 979,125

[22] Filed: Nov. 20, 1992

[30] Foreign Application Priority Data

Nov. 26, 1991 [DE] Fed. Rep. of Germany ....... 4138750

[51] Int. Cl.[5] .......................... C07F 3/00; D21H 25/18

[52] U.S. Cl. .......................... 106/257.24; 106/287.23; 162/160; 252/397; 556/51

[58] Field of Search ...................... 106/287.24, 287.23; 252/397; 162/160; 556/51

[56] References Cited

U.S. PATENT DOCUMENTS

| | | | |
|---|---|---|---|
| 3,676,182 | 7/1972 | Smith | 117/60 |
| 3,761,500 | 9/1973 | Thomas | 252/313.2 |
| 3,811,918 | 5/1974 | Levene | 501/77 |
| 3,969,549 | 7/1976 | Williams et al. | 427/248 |
| 5,104,997 | 4/1992 | Kamienski et al. | 556/180 |
| 5,208,072 | 5/1993 | Kamienski et al. | 427/296 |

FOREIGN PATENT DOCUMENTS

| | | |
|---|---|---|
| 273902 | 12/1987 | European Pat. Off. . |
| 3904111 | 8/1990 | Fed. Rep. of Germany . |
| 90/03466 | 4/1990 | PCT Int'l Appl. . |

OTHER PUBLICATIONS

Arnoult, Jean-Marie, "Mass-deacidification in France", pp. 1-5, (1987).

"The WeiT'O system", *Library Technology Reports*, pp. 410-411 (1987).

*Primary Examiner*—Anthony Green

*Attorney, Agent, or Firm*—Quarles & Brady

[57] ABSTRACT

A neutralizing agent for effective but mild mass deacidification of books and other paper products, consisting of a solution of one or more kinds of double alkoxides, each with one alkoxide of a metal promoting solubility, such as group IV metals, aluminum or tin, and one alkoxide of a metal binding the acids in the paper, such as alkali or alkaline earth metals, wherein a non-polar solvent can be used, which exhibits good compatibility with the archive materials.

7 Claims, No Drawings

NEUTRALIZING AGENT FOR PAPER PRODUCTS

BACKGROUND OF THE INVENTION

1. Field of the Invention

The present invention relates to neutralizing agents for effective but mild deacidification of books and also other printed and paper products of all kinds, such as newspapers or files for example.

The aging which occurs with all printed and paper products, especially books, during storage leads in particular to progressive damage to the paper material from traces of acids released in the paper. If no countermeasures are taken in the way of neutralizing these acids, the damage leads to complete destruction of the paper after some decades. In order to keep archive and library stocks of worldwide some hundreds of millions of books and other archive material it is therefore necessary to neutralize the acids in the paper and at the same time to bind to the paper a sufficient amount of a substance which will act as an alkali reserve and neutralize acids still to be released in the paper in the future. Having regard to the very large numbers of books, the only methods which are suitable are those which allow the treatment of whole books, i.e. methods in which it is not necessary to open the book binding and treat the pages individually. The same applies to archive materials of all kinds, which likewise require treatment of sheets of paper which are bound up or otherwise held together. The need to treat bound archives gives rise to the very important requirement that the neutralizing agent and in particular the solvent required for the treatment shall in no wise attack or modify the components of the archives, such as glues and adhesives, binding materials, printing and stamping inks as well as writing inks. Since the archives are to be treated in bound form, it is unavoidable that the individual sheets lie more or less tightly against each other during the treatment. For this reason it is especially important that printing inks, stamping inks and writing inks, with which the books are signed in many cases shall not be dissolved in any wise, so that bleeding of the writing on to the adjacent sheet will be avoided.

2. Description of the Prior Art

Of the known methods of de-acidification special importance attaches to those methods which employ compounds of the alkaline earth metals for the neutralization. Alkaline earth metals form very stable salts with the acids in the paper, which ensure reliable conservation and provide an alkaline reserve in the paper with pH values of around 8–9, which are compatible with the paper and do not cause any alkaline damage.

One known method for de-acidification of archive materials (U.S. Pat. No. 3,969,549) consists in treatment of the books with vapors of alkyl metals, especially with vapors of diethyl-zinc. Through the moisture in the paper, the alkyl metal is converted into the oxide of the metal, e.g. zinc oxide, which remains in the paper and forms a good neutralizing agent for free acids. The alkyl metals suitable for this purpose are however materials which decompose spontaneously in air, which present a constant risk of fire and explosion in their handling and therefore call for an extreme degree of care and corresponding qualifications.

According to another known method (EP 0 273 903 A2) the books are impregnated with an aqueous solution of calcium hydroxide, whereby free acids are bound as calcium salts. The treated and still wet books are shock frozen and freeze dried. Although effective de-acidification is possible with this method, it has to be recognized that, as is generally known, water acts unfavorably on paper, especially books. As well as curling of the paper and especially of book covers there is a risk of damaging the book glue and of washing out the inks and stamp inks. Furthermore, there is a risk of the ice crystals damaging the paper in the freeze drying, in spite of the shock freezing. Very long drying times are associated with the freeze drying, which can amount to 34 hours and make a sensible pattern of work impossible.

A further known method, the so-called Wei T'O method, which has been used in conservation practice since 1974, uses a solution of a magnesium organic compound for the treatment, such as methyl magnesium carbonate for example. This method is referred to also in the article "Mass de-acidification in France" by Jean-Marie Arnoult, Restaurator 22/13 984, 1987. In this method also the magnesium compounds are converted into magnesium oxide and magnesium carbonate by the moisture in the paper, these both being adapted to neutralize acids. Methyl magnesium carbonate is however like all alcoholates of alkali and alkaline earth metals insoluble in non-polar solvents. However, non-polar solvents are in fact especially suitable solvents because of their compatibility with the archive materials. The Wei T'O method therefore uses as solvents which are compatible with books such solvents as fluorochlorohydrocarbons for example, the solubility of the methyl magnesium carbonate being achieved by the addition of 10 to 20% of low boiling alcohols, such as methanol or ethanol. In practice it is found that these alcohol additives are enough to effect leaching out and bleeding on to the adjacent sheets of inks and stamping inks.

The cited problems in relation to the solvent are avoided in another known method (U.S. Ser. No. 252,421) in which magnesium glycolates are used. These glysolates also dissolve in non-polar solvents, such as trichlor-trifluor-ethane or hexane. However with the use of magnesium alcoholates of lower alcohols such as methanols, ethanols, butanols or even propanols, these alcohols are formed in the reaction with the moisture in the paper, as well as magnesium oxide, and vaporize in the ensuing drying on account of their volatility, with the use of glycolates, glycols result and remain in the paper on account of their higher boiling point. If not enough magnesium oxide is put into the paper to affect neutralization and to form an additional alkaline reserve in the paper, a corresponding amount of glycol unavoidably results, which remains in the paper and lends this a moist to greasy character.

SUMMARY OF THE INVENTION

The present invention is based on the object of providing a neutralizing agent which avoids the indicated disadvantages of the known methods and makes possible an effective, mild and efficient de-acidification of archive materials, especially without danger of damaging printing inks, glue or paper, as well as without leaving detrimental by-products after treating the paper.

This object is met by the invention defined in claim 1. Thus it has been found that double alkoxides of alkoxides of metals promoting solubility, such as group IV metals of the periodic system of elements and aluminum as well as tin, and alkoxides of metals which bind the free acids in the paper, such as alkaline earth metals or alkali metals, provide the required characteristics and are outstandingly suitable for mass de-acidification.

This is remarkable because e.g. the alcoholates or even alkoxides of the alkaline earth metals calcium and magnesium are insoluble in non-polar solvents, as is generally known. It is distinguished therefrom in that e.g. the double alkoxides of these metals with elements in group IV have excellent solubility in a number of non-polar solvents having very good compatibility with archive materials.

This has not been recognized until now, although work has been carried out over about twenty years with alkoxides and especially with mixtures of alkoxides (WO 90/03466 A1 and U.S. Pat. No. 3,676,182), where the solubility in organic solvents was obtained in that at least one of the metal valencies was occupied by multivalent alcohols and/or with ethers of multi-valent alcohols or with amino compounds. However, these materials remain in the paper on account of their relatively high boiling point. As is further explained below, the short chain, univalent alcohols which are possible with the invention for forming the double alkoxides are in contrast easy to disperse and do not exhibit this disadvantage. Finally attention must be drawn to the fundamental difference between alkoxides (or alcoholates) and double alkoxides. In the former the hydroxyl oxygen of an alcohol is replaced by a metal whereas in the double alkoxides of the invention what is involved in contrast are salts, e.g. of Mg or Ca alkoxide with the acidic reacting esters of ortho-titanic acid or ortho-zirconic acid.

These double alkoxides can be characterized by the general formula:

$MeI(OR)_x \bullet MeII(OR)_y$. According to the invention MeI is especially advantageously formed by the metals titanium and zirconium while the metals magnesium and calcium occupy the place of MeII with particular advantage. The OR groups can in principle be formed from e.g. alcohols of various kinds, (Univalent or multivalent alcohols with 1 to 5 carbon atoms). Preferably however in accordance with the invention there are used univalent alcohols with 1 to 5, preferably 2 to 4 C atoms, which vaporize easily.

Double alkoxides, e.g. of titanium and zirconium have been used hitherto as catalysts in organic chemistry. The fact that they are outstandingly suitable for mass de-acidification of paper was not previously known.

The following facts are important here. It would initially be expected with such double alkoxides that Ti or Zr salts would result in the acid binding in the paper as well as the desired formation of stable Mg or Ca salts. These weakly stable salts of Ti or Zr could for their part endanger the paper by release of acid. It has however surprisingly been found that these salts do not occur.

It has further been observed that a particularly advantageous hardening of the paper is effected by titanium.

With the double alkoxides according to the invention the metal MeII in the form of an alkaline earth metal (e.g. calcium, magnesium) or alkali metal (e.g. potassium or sodium) effects the neutralization of free acids and the formation of an alkaline reserve by reaction with the moisture in the paper and formation of oxides or hydroxides (e.g. calcium or magnesium oxides and hydroxides), which the metal MeI (preferably titanium or zirconium) effects the good solubility of these compounds.

It is an advantage with the alkaline earth metals that the hydroxides are only moderately alkaline, so that alkaline damage to the paper is avoided.

The alkoxide component of the MeI metal components (preferably titanium or zirconium) is likewise hydrolyzed into the hydroxides of these metals in contact with the paper moisture. These hydroxides are however converted very rapidly into the respective oxides, which have no significance for the neutralization on account of their chemical inertness.

Since these oxides are on the other hand present as a very fine powder, a further advantage according to the invention arises, that this fine powder prevents possible adhesion of the sheets, in the same way as is effected in other areas of the art e.g. by talcum, without however affecting the appearance.

in the case of a double alkoxide with calcium as MeII the further important advantage arises in accordance with the invention, that calcium forms insoluble and chemically especially inert calcium sulfate (gypsum) with the sulfuric acid traces in the paper. In known methods it was previously only possible to apply calcium to the paper in aqueous solution.

The recited double alkoxides are advantageously used as a solution in a suitable solvent, which contains e.g. 0.1–0.5% by weight magnesium or calcium. Suitable solvents are known materials such as fluorochlorohydrocarbons, e.g. trichlor-trifluor-ethane; benzine hydrocarbons, e.g. hexane, heptane; siloxanes, e.g. hexamethyldisiloxane; or fluoro-hydrocarbons, e.g. hexafluorbenzene.

It is of particular importance that the addition of an intermediary solvent, e.g. an alcohol, is not necessary with any of these solvents.

The use of the neutralizing agent according to the invention can be effected by methods of de-acidification known per se, especially for mass de-acidification of archive materials, e.g. by the method set forth in the patent specification DE 3 904 111. As a rule it is advantageous to dry the archives, which have a shelf moisture of approximately 5–10% by weight to a residual dryness of about 0.5% by weight, in a drying stage. The degree of this drying provides a good opportunity for regulating the amount of the neutralizing metal oxides introduced into the paper, where a greater amount of oxide precipitates from the solution and is bound in the paper with increasing moisture.

DESCRIPTION OF THE PREFERRED EMBODIMENTS

Two embodiments of the invention are described below with reference to the tabulated results of investigations, to explain the invention and its advantages.

Example 1:
50 g titaniumtetrabutylate.Magnesiumdiethylate
$Ti(O_4H_9)_4.Mg(OC_2H_5)_2$ dissolved in 950 g hexamethyldisiloxane

| | Moisture | pH value before treatment | pH value after treatment | *Alkaline buffer reserve (as weight % $MgCO_3$) |
|---|---|---|---|---|
| Uncoated paper | 0.5 wt % | 4.5 | 7.6 | 0.82 |
| No. 1 | 4.7 wt % | 4.5 | 8.8 | 1.79 |
| Uncoated paper | 0.5 wt % | 4.2 | 8.5 | 0.79 |
| No. II | 5.0 wt % | 4.2 | 9.5 | 2.32 |
| Uncoated paper | 0.5 wt % | 4.1 | 8.2 | 1.08 |
| No. III | 5.0 wt % | 4.1 | 8.9 | 1.77 |
| Coated paper | 0.5 wt % | 7.5 | 8.2 | 2.51 |

-continued

| Example 1: 50 g titaniumtetrabutylate.Magnesiumdiethylate $Ti(O_4H_9)_4.Mg(OC_2H_5)_2$ dissolved in 950 g hexamethyldisiloxane | | | |
|---|---|---|---|
| Moisture | pH value before treatment | pH value after treatment | *Alkaline buffer reserve (as weight % $MgCO_3$) |
| 5.0 wt % | 7.5 | 8.3 | 2.99 |

| Example 2: 110 g titaniumtetrabutylate.calciumdiethylate $Ti(O_2H_5)_4.Ca(OC_2H_5)_2$ dissolved in 890 g hexamethyldisiloxane | | | | |
|---|---|---|---|---|
| | Moisture | pH value before treatment | pH value after treatment | *Alkaline buffer reserve (as weight % $MgCO_3$) |
| Uncoated paper No. II | 0.5 wt % | 4.2 | 7.5 | 2.51 |
| | 5.0 wt % | 4.2 | 7.7 | 2.99 |

1. As appears from the tables, both dried and undried, i.e. shelf moist papers are treated. Books with different types of paper are considered. Microwave heating was used for pre-drying to a residual moisture of 0.5% by weight.

2. The actual treatment was effected in the form of a vacuum drying, in order to ensure good and uniform impregnation of the books. The time of action of the treating solutions then amounted to 10 minutes in each case.

The tables show on the one hand the successful binding of the acids by the change in pH value, (where the starting pH value is already higher with coated paper on account of the calcium carbonate component present as a result of the coating) and on the other hand that a sufficient buffer reserve can be bound in the paper. The tables show further that this can be regulated over a wide range by the paper moisture.

As well as the indicated metals of group IV, hafnium is for example also usable and also acts as a component yielding sufficient solubility but is somewhat more expensive than zirconium or titanium. Furthermore aluminum and tin may be substituted. In principle all alkaline earth metals or alkali metals can be used whose salts are able to neutralize the acids in the paper. As alkaline earth metal component strontium can be used for example; barium is less suitable because of its poisonous nature. As well as siloxanes, fluoro-hydrocarbons (e.g. hexafluorbenzene) or benzene-hydrocarbons are suitable as environmentally friendly solvents.

We claim:

1. A neutralizing agent for effective but mild mass de-acidification of books and other paper products, wherein the neutralizing agent comprises a solution of at least one double alkoxide, said double alkoxide consisting of a first and a second metal alkoxide, said first alkoxide being of a metal promoting solubility and said metal of said first alkoxide selected from the group consisting of titanium and zirconium and said second alkoxide being of a metal binding the acids in the paper and said metal of said second alkoxide selected from the group consisting of magnesium and calcium and wherein said double alkoxide is dissolved in a siloxane solvent.

2. A neutralizing agent according to claim 1 wherein the metal of said first alkoxide is titanium.

3. A neutralizing agent according to claim 1 wherein the metal of said first alkoxide is zirconium.

4. A neutralizing agent according to claim 1 wherein the metal of said second alkoxide is magnesium.

5. A neutralizing agent according to claim 1 wherein the metal of said first alkoxide is calcium.

6. A neutralizing agent according to claim 1, wherein the double alkoxide is formed from univalent alcohols with 1 to 5 carbon atoms.

7. A neutralizing agent according to claim 1, wherein the double alkoxide is formed from univalent alcohols with 2 to 4 carbon atoms.

* * * * *

UNITED STATES PATENT AND TRADEMARK OFFICE
CERTIFICATE OF CORRECTION

PATENT NO. : 5,322,558

DATED : June 21, 1994

INVENTOR(S) : Juergen Wittekind et al.

It is certified that error appears in the above-identified patent and that said Letters Patent is hereby corrected as shown below:

Column 5, line 22 after the "Example 2" Chart insert the footnote

--*The concept of "alkaline buffer reserve" is taken from the usage in the practice of conservation and calculated in each case as % by weight $MgCO_3$. The alkaline component is determined by titration for this and converted to magnesium carbonate.--

Signed and Sealed this

Fourth Day of October, 1994

Attest:

BRUCE LEHMAN

*Attesting Officer*

*Commissioner of Patents and Trademarks*